(12) United States Patent
An et al.

(10) Patent No.: US 9,405,413 B2
(45) Date of Patent: Aug. 2, 2016

(54) TOUCH PANEL AND DISPLAY DEVICE USING THE SAME

(71) Applicant: LG Display Co., Ltd., Seoul (KR)

(72) Inventors: Su Chang An, Seoul (KR); Deuk Su Lee, Gyeonggi-do (KR); Se jong Yoo, Gyeonggi-do (KR); Yang sik Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 108 days.

(21) Appl. No.: 14/094,926

(22) Filed: Dec. 3, 2013

(65) Prior Publication Data

US 2014/0176492 A1    Jun. 26, 2014

(30) Foreign Application Priority Data

Dec. 21, 2012 (KR) .......................... 10-2012-0150490

(51) Int. Cl.
*G06F 3/041* (2006.01)
*G06F 3/044* (2006.01)

(52) U.S. Cl.
CPC ...... *G06F 3/044* (2013.01); *G06F 2203/04111* (2013.01)

(58) Field of Classification Search
CPC .................. G06F 3/044; G06F 2203/04111
USPC ........................................................ 345/174
See application file for complete search history.

(56) References Cited

U.S. PATENT DOCUMENTS

| 2010/0302201 | A1* | 12/2010 | Ritter ...................... G06F 3/044 |
| | | | 345/174 |
| 2012/0044196 | A1 | 2/2012 | Mizuhashi et al. |
| 2012/0075238 | A1 | 3/2012 | Minami et al. |
| 2013/0293508 | A1* | 11/2013 | Lin et al. ........................ 345/174 |

FOREIGN PATENT DOCUMENTS

| CN | 101907963 A | 12/2010 |
| CN | 102419670 A | 4/2012 |
| CN | 102799313 A | 11/2012 |
| TW | 201214229 A | 4/2012 |

OTHER PUBLICATIONS

Taiwanese Office Action dated Jul. 14, 2015, in Taiwanese Application No. 102134176.
Chinese Office Action dated Mar. 30, 2016 in Chinese Application No. 201310629633.4.

\* cited by examiner

*Primary Examiner* — Jonathan Boyd
(74) *Attorney, Agent, or Firm* — Morgan, Lewis & Bockius LLP (57) ABSTRACT

Disclosed is a touch panel and a display device using the same, wherein lines are formed at different layers in a bezel of the touch panel, and one or more insulating layers are interposed between each layer comprising the lines, or adjacent sides of driving electrode and receiving electrode for forming an intersection including an outermost crossing region formed in an outermost region of an active area are corrugated.

20 Claims, 6 Drawing Sheets

FIG. 1

[ Related Art ]

[ Related Art ]

TOUCH PANEL AND DISPLAY DEVICE USING THE SAME

CROSS REFERENCE TO RELATED APPLICATIONS

This application claims the benefit of the Korean Patent Application No. 10-2012-0150490 filed on Dec. 21, 2012, which is hereby incorporated by reference as if fully set forth herein.

BACKGROUND

1. Field of the Disclosure

Embodiments of the present invention relate to a touch panel, and more particularly, to a touch panel attached to a top surface of a panel, and a display device using the same.

2. Discussion of the Related Art

Touch screens are a type of input device that is included in display devices such as Liquid Crystal Displays (LCDs), Field Emission Displays (FEDs), Plasma Display Panel (PDPs), Electroluminescent Displays (ELDs), and Electrophoretic Display (EPDs), and allows a user to input information by directly touching a screen with a finger, a pen or the like while a user looks at the screen of the display device.

Touch panels may be configured in various types depending on an arrangement position in a display device.

First, the touch panel may be formed in an on-cell type in which the touch panel is attached to a top surface of a panel.

Second, the touch panel may be formed in an in-cell type in which two electrodes of the touch panel are formed in a same layer of a thin film transistor (TFT) substrate of a liquid crystal panel.

Third, the touch panel may be formed in a hybrid type in which one of two electrodes of the touch panel is formed in the TFT substrate of the liquid crystal panel and the other is formed at the top surface of a color filter substrate.

Fourth, the touch panel may be formed in an add-on type in which a film including a touch electrode is attached to a tempered glass, or a touch electrode is formed in a tempered glass itself.

The in-cell type touch panel and the hybrid type touch panel may be generally applied to a liquid crystal display, but the on-cell type touch panel and the add-on type touch panel may be attached to a top surface of a panel of a display device irrespective of the type of the display device.

Figure 1:
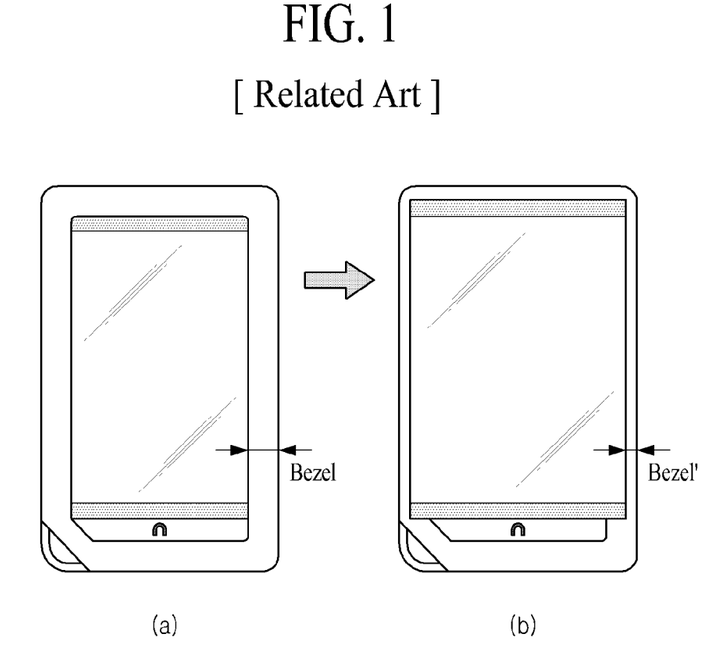
FIG. 1 is an exemplary view illustrating the exterior of a display device according to the related art.
Figure 2:
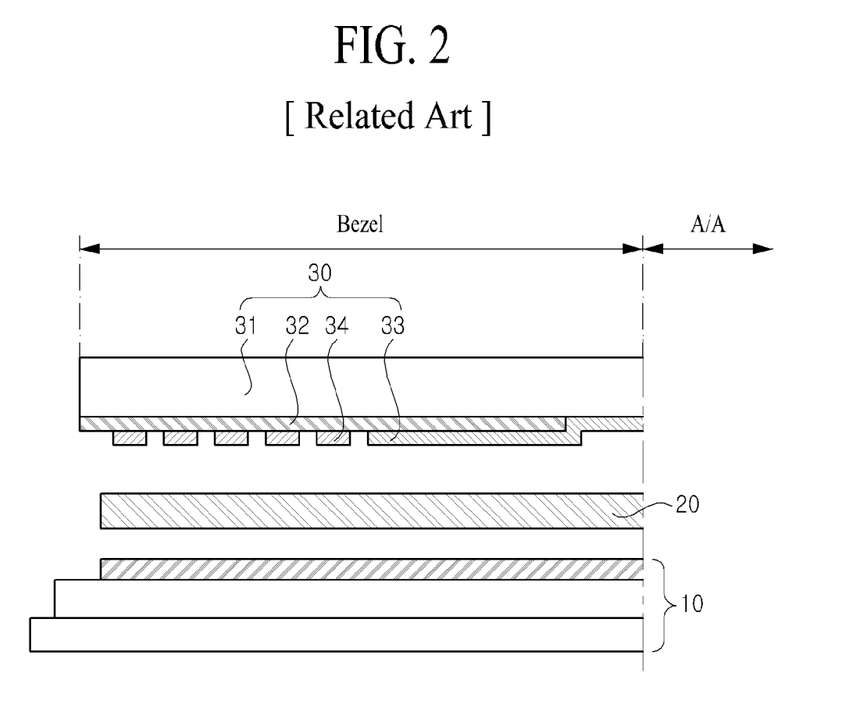
FIG. 2 is an exemplary view illustrating a cross section of a bezel in a display device provided with an add-on type touch panel according to the related art.
Figure 3:
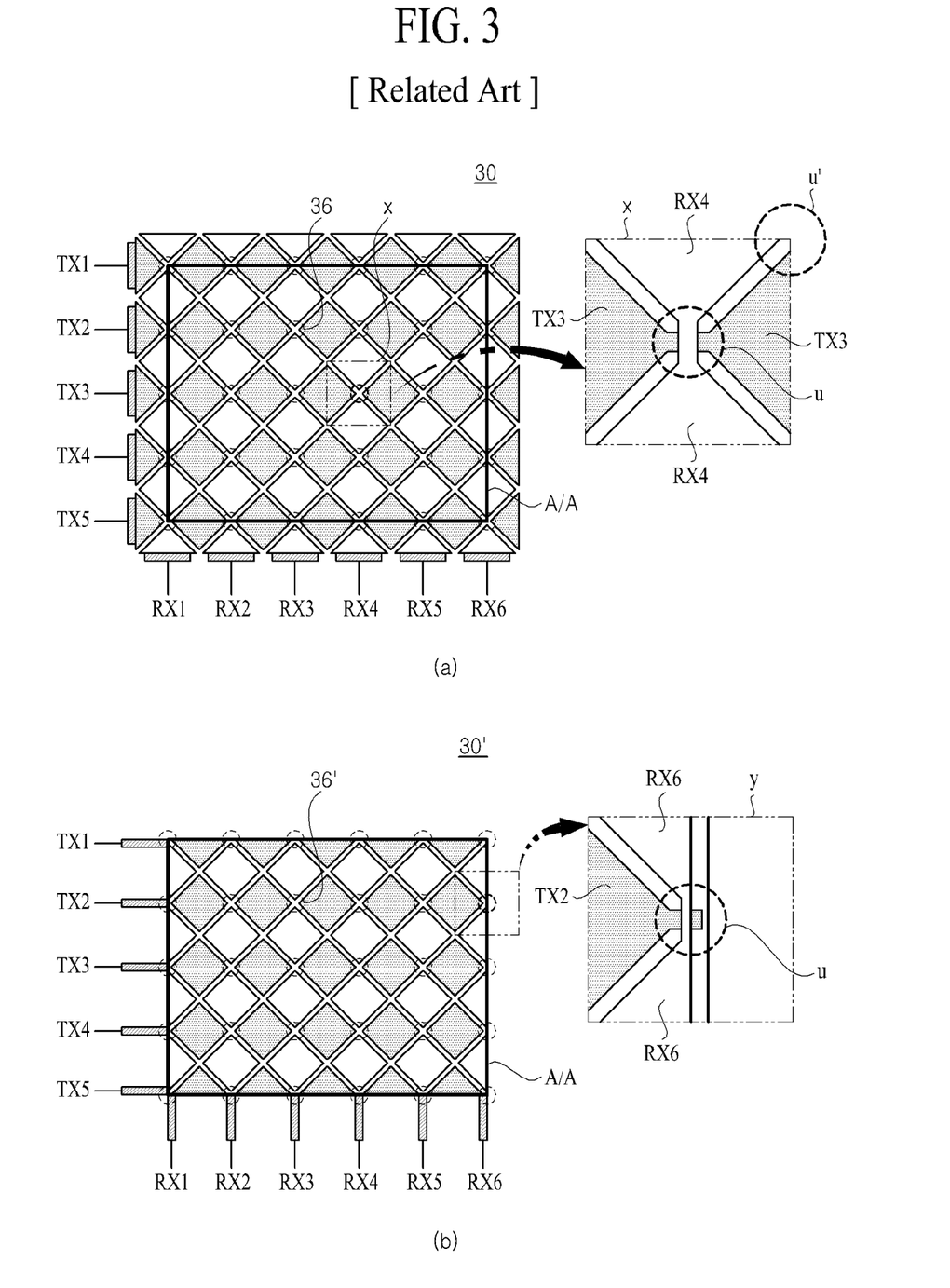
FIG. 3 is an exemplary view illustrating an arrangement structure of driving electrodes and receiving electrodes in a touch panel according to the related art.

FIG. 1 is an exemplary view illustrating the exterior of a display device according to the related art. FIG. 2 is an exemplary view illustrating a cross section of a bezel in a display device provided with an add-on type touch panel according to the related art. FIG. 3 is an exemplary view illustrating an arrangement structure of driving electrodes and receiving electrodes in a touch panel according to the related art In case of the related art, since a research and development of product was been mainly focused on a function of a touch panel, a bezel corresponding to a non-display area of panel or display device has not been studied actively. Thus, as shown in FIG. 1(a), a width of bezel is formed largely.

Recently, in addition to the research and development in technical and functional aspects, a design aspect of a product is being mainly researched and studied. As shown in 1(b), there has been provided a display device having a bezel' whose width is relatively reduced in comparison to the related art.

As shown in FIG. 1, a bezel corresponds to a circumferential area, that is, a non-display area on which an image is not displayed. As shown in FIG. 1, a bezel may be a non-display area when a case is mounted thereon, or a bezel itself may be a non-display area. Generally, a width of bezel in a display device depends on a width of bezel in a panel, whereby a method of reducing the bezel of the panel has been studied actively.

Meanwhile, according as a function of the display device varies, the display device is developed to satisfy a trend of increasing a display area on which an image is displayed.

Especially, the display device is designed in such a manner that a width of bezel is reduced so as to create an effect of increasing a display area under a condition that a size of display area is kept intact.

However, the display device according to the related art has limitations on reduction of width in the bezel.

First, in case of a panel with a touch panel, in order to reduce a width of bezel, there is an attempt to decrease a glass cutting area and a sensor expand area provided to sense a touch on a display area of the touch panel, as well as a routing area provided with a touch electrode line.

However, if a size of the bezel is reduced below a preset level, it is difficult to obtain a margin of the routing area, sensor expand area, and glass cutting area.

A cross section of a routing area included in a bezel of an on-cell type display device in which a touch panel 30 is attached to a top surface of a panel 10 by UV resin 20 will be shown in FIG. 2.

That is, in case of a related art touch panel, as shown in FIG. 2, metal routing lines 34 are formed on an lower surface of a black matrix 32 attached to a surface of a glass substrate 31, wherein the metal routing lines 34 are provided in parallel, and are connected to touch electrodes. Also, a sensor expand electrode 33, which expands from the touch electrode, is formed in parallel to the metal routing lines 34.

According to the above structure, a width of the routing area, that is, a width of bezel is reduced by reducing a width of the metal routing line 34, to thereby reduce an pitch between each of the metal routing lines 34.

However, if the metal routing line 34 is reduced in width, a resistance is increased, whereby touch sensitivity might be degraded. Also, a range of reducing the width of the metal routing line 34 is limited. According as the interval between each of the metal routing lines 34 is reduced, the touch sensitivity may be degraded due to noise occurring between each of the metal routing lines 34.

Thus, a method of reducing the width of the metal routing line 34 and the interval between each of the metal routing lines 34 has limitations.

Second, in case of a related art touch panel 30 comprising five driving electrodes TX1 to TX5 which receive driving pulses, and six receiving electrodes RX1 to RX6 which receive sensing signals, as shown in FIG. 3(a), there may be thirty touch coordinates 36.

In order to explain touch sensitivity at each of the touch coordinates 36, as shown in an expanded square part 'x' of FIG. 3(a), the driving electrode TX3 and receiving electrode RX4 cross each other in a capacitive type touch panel. Generally, touch sensitivity at a crossing region of the driving electrode and receiving electrode (hereinafter, referred to as 'crossing region', u) is greater than touch sensitivity at a region (u') where the driving electrode is adjacent to the receiving electrode.

Accordingly, as shown in FIG. 3(a), the related art touch panel is provided in such a manner that the crossing region of the driving electrode and receiving electrode, that is, the region of the touch coordinates 36 is included in an active area A/A (display area) on which an image is displayed, and a bezel is formed in the circumferential area. That is, the driving electrode and receiving electrode crossing each other are formed on the touch panel, but the region which is not included in the active area A/A corresponds to an over scan area, wherein the over scan area is formed in the bezel. That is, according as the over scan area is increased in size, the bezel is increased in width.

In order to reduce the width of bezel, the related art touch panel may be provided with the over scan area which is cut, as shown in FIG. 3(b).

That is, the number of touch coordinates 36' in the active area A/A of the touch panel 30' shown in FIG. 3(b) is the same as the number of touch coordinates 36 in the active area A/A of the touch panel 30 shown in FIG. 3(a). However, unlike the over scan area of the touch panel 30 shown in FIG. 3(a), the over scan area formed in the bezel of the touch panel 30' shown in FIG. 3(b) is cut to be smaller, whereby an occupying size of the over scan area is reduced, and thus the width of bezel is reduced.

As shown in an expanded square part 'y' of FIG. 3(b), the crossing regions of the driving electrode and receiving electrode and the regions where the driving electrode is adjacent to the receiving electrode in the outermost area of the touch panel are smaller in number than those in the other areas of the touch panel.

Thus, as described above, on the assumption that thirty of the touch coordinates 36 are formed in the touch panel 30' by the five driving electrodes and six receiving electrodes, touch sensitivity in eighteen of the touch coordinates in the outermost area of the active area A/A is relatively lower than touch sensitivity in twelve of the touch coordinates in the other areas of the active area A/A.

As a result, there are limitations on reduction of over scan area formed in the circumference of the touch panel.

SUMMARY

Accordingly, embodiments of the present invention are directed to a touch panel and a display device using the same that substantially obviate one or more problems due to limitations and disadvantages of the related art.

An aspect of embodiments of the present invention is directed to provide a touch panel in which lines are formed at different layers in a bezel, and one or more insulating layers are interposed between each layer comprising the lines, and a displaying device using the same.

Another aspect of embodiments of the present invention is directed to provide a touch panel in which adjacent sides of driving electrode and receiving electrode for forming an intersection including an outermost crossing region formed in an outermost region of an active area are corrugated, and a display device using the same.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a touch panel comprising: a glass substrate; a plurality of driving electrodes formed in an active area on one surface of the glass substrate, wherein a driving pulse is input to the plurality of driving electrodes; a plurality of receiving electrodes formed in the active area on one surface of the glass substrate, wherein the receiving electrode crosses the driving electrode; a plurality of driving electrode lines respectively connected with the plurality of driving electrodes; and a plurality of receiving electrode lines respectively connected with the plurality of receiving electrodes, wherein the plurality of driving electrode lines are formed at different layers in a bezel corresponding to a circumferential area of the active area, and one or more insulating layers are respectively interposed between each layer comprising the driving electrode lines.

In another aspect of the present invention, there is provided a touch panel comprising: a glass substrate; a plurality of driving electrodes formed in an active area on one surface of the glass substrate, wherein a driving pulse is input to the plurality of driving electrodes; and a plurality of receiving electrodes formed in the active area on one surface of the glass substrate, wherein the receiving electrode crosses the driving electrode, wherein a shape of the driving electrode and receiving electrode formed in an outermost region of the glass substrate is different from that of the other driving electrode and receiving electrode formed inside the glass substrate.

In another aspect of the present invention, there is provided a touch panel comprising: a glass substrate; a plurality of driving electrodes formed in an active area on one surface of the glass substrate, wherein a driving pulse is input to the plurality of driving electrodes; and a plurality of receiving electrodes formed in the active area on one surface of the glass substrate, wherein the receiving electrode crosses the driving electrode, wherein adjacent sides of the driving electrode and receiving electrode for forming an intersection including an outermost crossing region formed in an outermost region of the active area, among crossing regions of the driving electrode and receiving electrode, are corrugated.

In another aspect of the present invention, there is provided a display device comprising: a panel which includes pixels formed in respective crossing regions of gate and data lines; a touch panel including a plurality of driving electrode lines, the touch panel attached to a top surface of the panel, wherein the plurality of driving electrode lines connected with driving electrodes are formed at different layers in a bezel, and one or more insulating layers are respectively interposed between each layer comprising the driving electrode lines; a driver for driving the panel; and a touch IC for driving the touch panel.

In another aspect of the present invention, there is provided a display device comprising: a panel which includes pixels formed in respective crossing regions of gate and data lines; a touch panel in which a plurality of driving electrodes and receiving electrodes cross each other, and adjacent sides of the driving electrode and receiving electrode for forming an intersection including an outermost crossing region formed in an outermost region of an active area, among crossing regions of the driving electrode and receiving electrode, are corrugated; a driver for driving the panel; and a touch IC for driving the touch panel.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, embodiments of the present invention will be described in detail with reference to the accompanying drawings.

Hereinafter, for convenience of explanation, a liquid crystal display (LCD) device according to the present invention is described as an example, but it is not limited to the LCD device. That is, embodiments of the present invention may be applied to various types of display device provided with an add-on type touch panel, or on-cell type touch panel.

Figure 4:
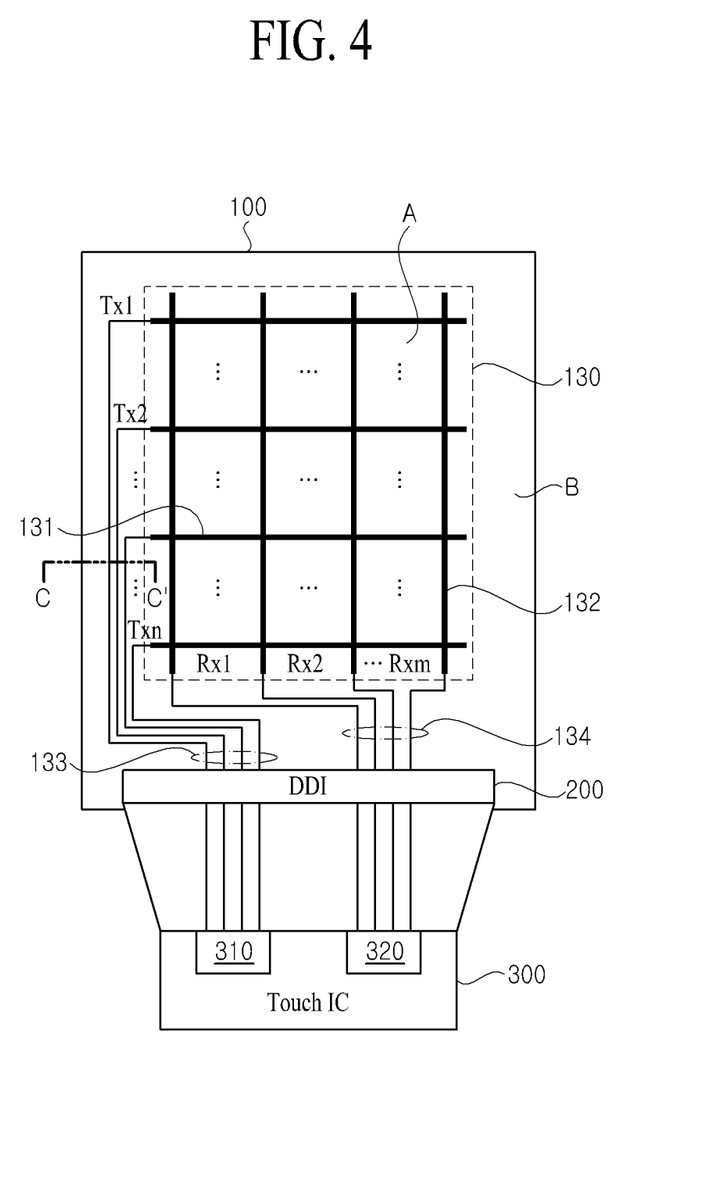
FIG. 4 schematically illustrates a structure of a display device according to the present invention.
Figure 5:
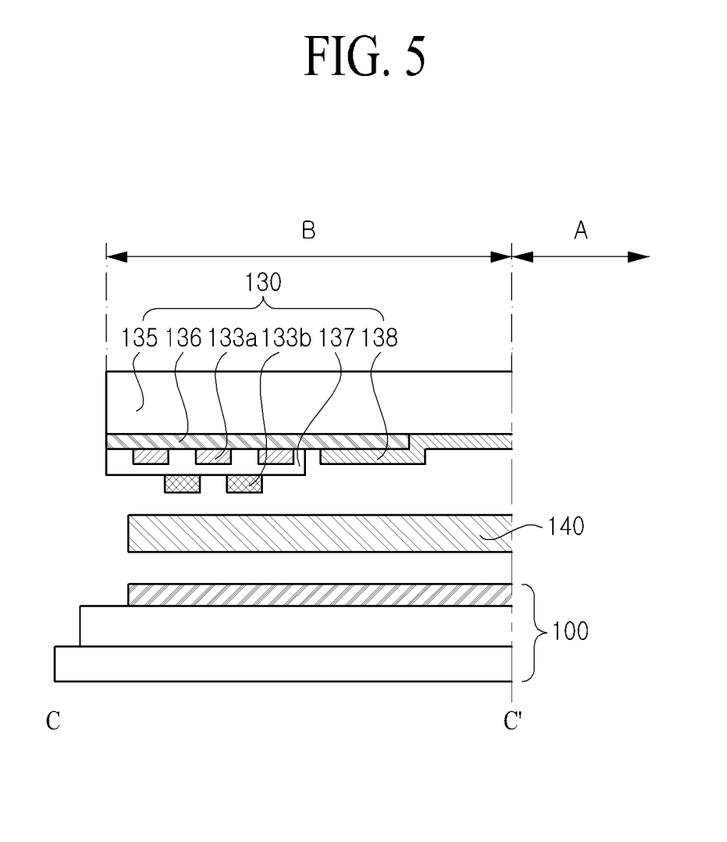
FIG. 5 is a cross sectional view illustrating a display device provided with a touch panel according to the first embodiment of the present invention.

FIG. 4 schematically illustrates a structure of a display device according to the present invention. FIG. 5 is a cross sectional view illustrating a display device provided with a touch panel according to the first embodiment of the present invention, which is a cross sectional view along C-C' of FIG. 4.

As shown in FIG. 4, a display device according to the present invention includes a panel 100 which includes pixels formed in respective crossing regions of gate and data lines, a touch panel 130 which is attached to a top surface of the panel 100, a driver 200 for driving the panel 100, and a touch IC 300 for driving the touch panel 130. In this case, driving electrode lines 133 connected with driving electrodes are provided in a bezel (non-display area, B), wherein the driving electrode lines 133 are formed at different layers, and one or more insulating layers are interposed between each layer comprising the driving electrode lines 133.

First, as shown in FIG. 5, the panel 100 is attached to the touch panel 130 by UV resin.

If the panel 100 is a liquid crystal panel, on a lower substrate (TFT substrate) of the panel 100, there are a plurality of gate and data lines crossing each other, a plurality of thin film transistors TFT at respective crossing regions of the gate and data lines, a plurality of pixel electrodes and a common electrode. In this case, the plurality of pixel electrodes are provided to charge a data voltage in each pixel. Also, the common electrode, together with the pixel electrode, drives liquid crystal molecules in a liquid crystal layer. The plurality of pixels may be arranged in a matrix configuration by the gate and data lines crossing each other.

On an upper substrate (color filter substrate, CF substrate) of the panel 100, there are a black matrix BM and a color filter.

Also, two polarizing plates (not shown in FIG. 5) are respectively attached to the lower and upper glass substrates of the panel 100, and an alignment film is formed in an inner surface being in contact with the liquid crystal so as to set a pre-tilt angle of liquid crystal. Between the lower and upper glass substrates of the panel 100, a column spacer (not shown in FIG. 5) may be formed in order to maintain a cell gap.

In addition to the liquid crystal panel, however, the panel 100 may be formed in various kinds and types.

An area of the panel 100 may be divided into an active area (display area) A on which an image is displayed, and a non-display area B on which an image is not displayed, wherein the non-display area B surrounding the active area A corresponds to a bezel.

Then, the touch panel 130 senses a user's touch, that is, whether or not there is a user's touch. Especially, the touch panel 130 applied to the present invention is a capacitive type touch panel using a mutual method. The touch panel 130 of capacitive type using the mutual method includes driving electrodes and receiving electrodes.

The touch panel 130 includes an active area corresponding to the active area of the panel 100, and a bezel corresponding to the bezel B of the panel 100. In FIG. 4, for convenience of explanation, a reference number '130' of the touch panel is shown to correspond with the active area A, however, the touch panel 130 also includes the bezel B outside the active area A, virtually.

Accordingly, the touch panel 130 includes the driving electrode lines 133 and receiving electrode lines 134 formed in the active area A and bezel B.

The driving electrodes 131 and receiving electrodes 132 are provided in a lattice configuration on a glass substrate 135.

The driving electrode lines 133 connected with the driving electrodes 131 and the receiving electrode lines 134 connected with the receiving electrodes 132 are formed in the bezel B. The driving electrode lines 133 and receiving electrode lines 134 may be connected with the touch IC 300 by the driver 200, or may be directly connected with the touch IC 300.

FIG. 5 is a cross section view illustrating a routing area included in a bezel of a display device provided with a touch panel according to the embodiment of the present invention in which a touch panel 130 is attached to a top surface of a panel 100 by UV resin 140.

As shown in FIG. 5, the driving electrode lines 133 may be formed at different layers in the bezel B.

That is, as shown in FIG. 5, the driving electrode lines 133 are provided in the bezel B outside the active area A, and are formed at different layers with one or more insulating layers 137 interposed therebetween.

For example, as shown in FIG. 5, the driving electrode lines 133 are grouped into a first group including the driving electrode lines 133a, and a second group including the driving electrode lines 133b. In this case, the driving electrode lines 133a included in the first group may be provided at fixed intervals on the black matrix 136 deposited on the glass substrate 135, and the driving electrode lines 133b included in the second group may be provided at fixed intervals on the insulating layer 137 deposited on the driving electrode lines 133a of the first group.

Also, the driving electrode lines 133a of the first group may be again grouped into two or more sub-groups, and the driving electrode lines 133b of the second group may be again grouped into two or more sub-groups. In the same manner as the driving electrode lines 133a included in the first group and the driving electrode lines 133b included in the second group, the respective sub-groups may be provided at different layers, and the other insulating layer may be interposed between each of the sub-groups.

The respective driving electrode lines 133 are connected with sensor expand areas 138 which are respectively connected with the driving electrodes 131 in the active area A.

Then, the driver 200 is provided to drive the panel 100. The driver 200 may include a gate driver which provides a scan pulse to the gate line in the panel 100, a data driver which provides a data voltage to the data line in the panel 100, and a timing controller which controls the gate driver and data driver.

In this case, the gate driver, data driver and timing controller included in the driver 200 may be configured as one chip DDI, as shown in FIG. 4, or may be configured individually. The data driver and timing controller may be configured as the chip DDI, and the gate driver may be configured as a GIP type formed in the panel 100.

That is, the driver 200 may vary in structure.

The touch IC 300 applies a driving pulse to the driving electrode 131, and then senses whether or not the touch panel 130 is touched through the use of sensing signal received by the receiving electrode 132. To this end, the touch IC 300 may include an output portion 310 for outputting the driving pulse, and a receiving portion 320 for receiving the sensing signal.

The touch IC 300 may be connected with the driving electrode lines 133 and receiving electrode lines 134 through the driver 200, or may be directly connected with the driving electrode lines 133 and receiving electrode lines 134.

Figure 6:
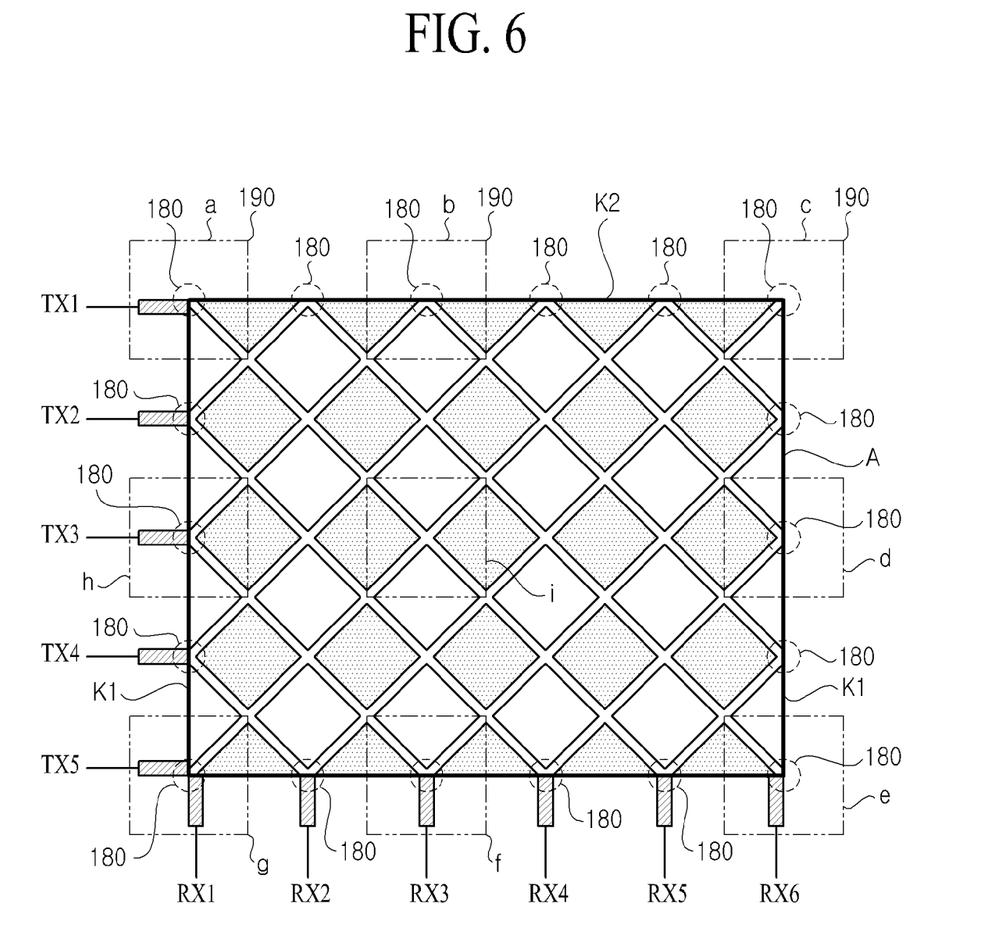
FIG. 6 is an exemplary view illustrating a touch panel according to the second embodiment of the present invention.
Figure 7:
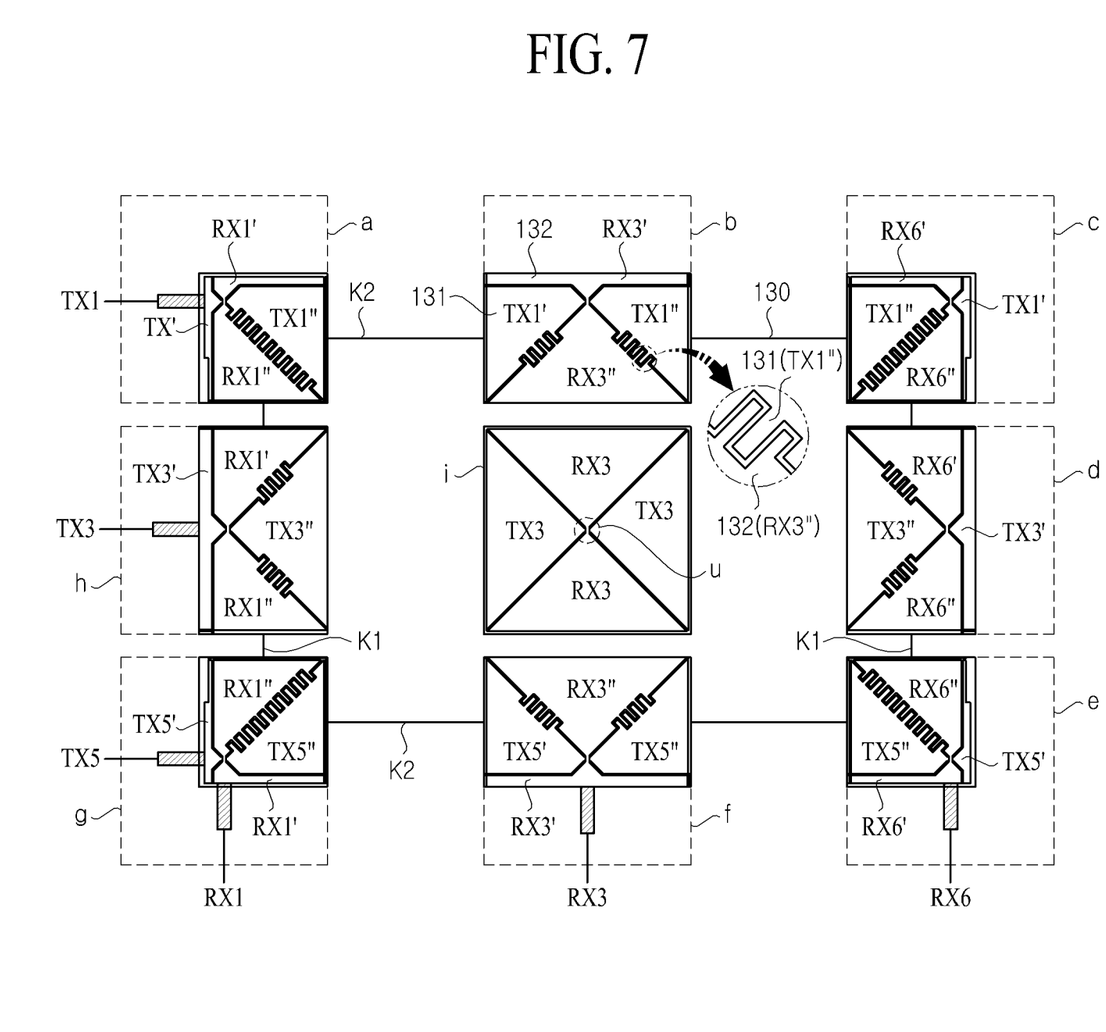
FIG. 7 is an expanded view illustrating each part of the touch panel shown in FIG. 6.

FIG. 6 is an exemplary view illustrating a touch panel according to the second embodiment of the present invention, which shows only active area A of a touch panel 130 of FIG. 4. The touch panel 130 includes an active area A, and a bezel B, and the touch panel shown in FIG. 6 shows only active area A. FIG. 7 is an expanded view illustrating each part of the touch panel shown in FIG. 6. Among respective parts of the touch panel according to the second embodiment of the present invention, the parts which are similar or identical to those of the touch panel already described with reference to FIGS. 4 and 5 will be described briefly, or will be omitted.

Basically, the touch panel according to the second embodiment of the present invention has a structure of the touch panel described with reference to FIG. 3(b). In the touch panel according to the second embodiment of the present invention, a bezel B is minimized so as to reduce a size of bezel B in the touch panel.

Like the touch panel according to the first embodiment of the present invention described with reference to FIGS. 4 and 5, the touch panel according to the second embodiment of the present invention includes a glass substrate 135, a plurality of driving electrodes 131 to which a driving pulse is input, and a plurality of receiving electrodes 132 respectively provided to cross the plurality of driving electrodes 131. The plurality of driving electrodes 131 and receiving electrodes 132 are formed in an active area A on one surface of the glass substrate 135.

Especially, among crossing regions of the driving electrode 131 and receiving electrode 132 on the touch panel according to the second embodiment of the present invention, adjacent sides of the driving electrode 131 and receiving electrode 132, which form intersections 190 including the outermost crossing regions 180 provided in the outermost region of the active area A, are corrugated.

As shown in FIG. 6, the outermost crossing region 180 may be the crossing region provided being close to the inner side of the four outermost lines of the active area A.

As explained in the above description of the related art with reference to FIG. 3(a), the crossing region is the region (u) where the driving electrode and receiving electrode cross each other. In FIG. 7, the crossing region is also marked with (u).

Meanwhile, the touch panel 130 shown in FIG. 6 is provided with the five driving electrodes TX1 to TX5 and the six receiving electrodes RX1 to RX6, whereby the driving electrodes and receiving electrodes cross at the thirty crossing regions (u).

Among the crossing regions (u), the crossing regions formed in the outermost region of the active area A are referred to as the outermost crossing regions 180.

That is, in case of the touch panel 130 shown in FIG. 6, there are the eighteen outermost crossing regions 180.

The aforementioned four outermost lines are the boundary lines between the active area A and the bezel B. In FIG. 6, the outermost lines correspond to the circumferential lines of the active area A.

The intersection 190 includes the outermost crossing region 180, which is the region occurring the same touch coordinates. That is, if touching any one part of the intersection 190 and the outermost crossing region 180 included in the intersection 190, it may be sensed as the same touch coordinates.

At the intersection 190, the adjacent sides of the driving electrode 131 and receiving electrode 132 are corrugated. That is, as shown in an expanded circle 'b' of FIG. 7, the adjacent sides of the driving electrode 'TX1' 131 and the receiving electrode 'RX3' 132 at the intersection 190 are partially corrugated.

According to the second embodiment of the present invention, the adjacent sides of the driving electrode and receiving electrode are partially corrugated in order to increase a variation of capacitance.

That is, in case of the touch panel of mutual capacitance type according to the present invention, a touch performance may be checked by a variation in fringe capacitance between the driving electrode TX and receiving electrode RX before and after touching. According as the variation of fringe capacitance becomes larger, the touch sensitivity becomes better. Thus, the driving electrode and receiving electrode have to be formed in a structure capable of increasing the fringe capacitance.

Especially, some parts of the driving electrode and receiving in the bezel B are cut so as to reduce a width of bezel in the touch panel, whereby the fringe capacitance of the intersection 190 is also decreased. In order to compensate for the decreased fringe capacitance, as shown in FIG. 7, the adjacent sides of the driving electrode 131 and receiving electrode 132 at the intersection 190 are corrugated in the touch panel according to the second embodiment of the present invention.

At the intersection 190 of the touch panel, the fringe capacitance is very small. In order to compensate for the small capacitance at the intersection 190 of the touch panel, the facing sides of the driving electrode and receiving electrode formed at the intersection 190 are corrugated.

These corrugated sides may be formed in various shapes or the shape of FIG. 7. For example, the corrugated sides may be formed in a wave shape, or the other curved shape.

According to each location in the touch panel, the intersection 190 may vary in shape.

Among the outermost crossing regions formed adjacent to the outermost line, a first driving electrode section is formed in each of the intersections 190 formed along the first outermost line 'k1' being parallel to the receiving electrodes while being in parallel to the first outermost line 'k1'. Also, a second driving electrode section is connected with the first driving electrode section through the outermost crossing region, a first receiving electrode section is formed in a first lateral side between the first driving electrode section and second driving electrode section, and a second receiving electrode section is connected with the first receiving electrode section through the outermost crossing region.

In this case, as shown in FIGS. 6 and 7, 'd' region and 'h' region are included in the intersections 190 formed along the first outermost line 'k1' in parallel to the receiving electrodes among the outermost crossing regions formed adjacent to the outermost line.

In the 'd' region and 'h' region, the first driving electrode section and the second driving electrode section may respectively correspond to TX3' and TX3". Both TX3' and TX3", which are differently expressed for convenience of explanation, form the first driving electrode TX3. That is, TX3' and TX3" are connected with each other through the cross region of the intersection 190.

In the 'd' region, the first receiving electrode section and the second receiving electrode section may respectively correspond to RX6' and RX6". Both RX6' and RX6" form the sixth receiving electrode. That is, the first receiving electrode section and the second receiving electrode section are connected to each other through the crossing region of the intersection 190.

In the 'h' region, the first receiving electrode section and the second receiving electrode section may respectively correspond to RX1' and RX1". Both RX1' and RX1" form the first receiving electrode. That is, the first receiving electrode section and the second receiving electrode section are connected with each other through the crossing region of the intersection 190.

In the 'd' region, the adjacent sides of the second driving electrode section TX3" and the first receiving electrode section RX6' are corrugated, and the adjacent sides of the second driving electrode section TX3" and the second receiving electrode section RX6" are corrugated.

In the 'h' region, the adjacent sides of the second driving electrode section TX3" and the first receiving electrode section RX1' are corrugated, and the adjacent sides of the second driving electrode section TX3" and the second receiving electrode section RX1" are corrugated.

In the 'd' region and 'h' region, the adjacent sides of the first driving electrode section and the first receiving electrode section or the adjacent sides of the first driving electrode section and the second receiving electrode section are not corrugated, but they may be corrugated if needed.

Among the outermost crossing regions formed adjacent to the outermost line, a third receiving electrode section is formed in each of the intersections 190 formed along the second outermost line 'k2' being in parallel to the driving electrodes while being in parallel to the second outermost line 'k2'. Also, a fourth receiving electrode section is connected with the third receiving electrode section through the outermost crossing region, a third driving electrode section is formed in a second lateral side between the third receiving electrode section and the fourth receiving electrode section, and a fourth driving electrode section is connected with the third driving electrode section through the outermost crossing region.

In this case, as shown in FIGS. 6 and 7, 'b' region and 'f' region are included in the intersections 190 formed along the second outermost line 'k2' in parallel to the driving electrodes among the outermost crossing regions formed adjacent to the outermost line.

In the 'b' region and 'f' region, the third receiving electrode section and the fourth receiving electrode section respectively correspond to RX3' and RX3". Both RX3' and RX3", which are differently expressed for convenience of explanation, form the third receiving electrode RX3. That is, RX3' and RX3" are connected with each other through the cross region of the intersection 190.

In the 'b' region, the first driving electrode section and the second driving electrode section may respectively correspond to TX1' and TX1". Both TX1' and TX1" form the first driving electrode. That is, the first driving electrode section and the second driving electrode section are connected to each other through the crossing region of the intersection 190.

In the 'f' region, the first driving electrode section and the second driving electrode section may respectively correspond to TX5' and TX5". Both TX5' and TX5" form the fifth driving electrode. That is, the first driving electrode section and the second driving electrode section are connected with each other through the crossing region of the intersection 190.

In the 'b' region, the adjacent sides of the fourth receiving electrode section RX3" and the first driving electrode section TX1' are corrugated, and the adjacent sides of the fourth receiving electrode section RX3" and the second driving electrode section TX1" are corrugated.

In the 'f' region, the adjacent sides of the fourth receiving electrode section RX3" and the first driving electrode section TX5' are corrugated, and the adjacent sides of the fourth receiving electrode section RX3" and the second driving electrode section TX1" are corrugated.

In the 'b' region and 'f' region, the adjacent sides of the third receiving electrode section and the first driving electrode section or the adjacent sides of the third receiving electrode section and the second driving electrode section are not corrugated, but they may be corrugated if needed.

While being parallel to the first outermost line 'k1', a first driving electrode section is formed in each of the intersections 190 formed at the crossing region of the first outermost line 'k1' being parallel to the receiving electrodes and the second outermost line 'k2' being parallel to the driving electrodes, among the outermost crossing regions formed adjacent to the outermost line. Also, a second driving electrode section is connected with the first driving electrode section through the outermost crossing region. Then, a third receiving electrode section is formed in a first lateral side between the first driving electrode section and the second driving electrode section, and is provided in parallel to the second outermost line. A fourth receiving electrode section is connected with the third receiving electrode section through the outermost crossing region.

In this case, as shown in FIGS. 6 and 7, 'a' region, 'c' region, 'e' region and 'g' region are included in the intersections 190 formed at the crossing region of the first outermost line 'k1' being parallel to the receiving electrodes and the second outermost line 'k2' being parallel to the driving electrodes.

Among the 'a' region, 'c' region, 'e' region and 'g' region, a structure of the intersection 190 formed at the crossing region of the first outermost line 'k1' being parallel to the receiving electrodes and the second outermost line 'k2' being parallel to the driving electrodes will be described as follows with reference to the 'c' region.

In the 'c' region, the first driving electrode section is TX1', the third receiving electrode section is RX6', the second driving electrode section is TX1", and the fourth receiving electrode section is RX6".

In this case, both TX1' and TX1" form the first driving electrode TX1, and both RX6' and RX6" form the sixth receiving electrode RX6.

Among the intersections 190 formed at the crossing region of the first outermost line 'k1' being parallel to the receiving electrodes and second outermost line 'k2' being parallel to the driving electrodes, the first driving electrode section TX1' and the third receiving electrode section RX6' formed in the outermost region are provided along the outermost lines.

The adjacent sides of the second driving electrode section TX1" and fourth receiving electrode section RX6" are corrugated.

Also, the adjacent sides of the third receiving electrode section RX6' and second driving electrode section TX1" may be corrugated if needed, and the adjacent sides of the fourth receiving electrode section RX6" and first driving electrode section TX1' may be corrugated if needed.

The intersections 190 of the 'e' region, 'g' region and 'a' region may be formed in the same manner as that of the 'c' region, as described above.

That is, the driving electrodes and receiving electrodes formed in the outermost region of the touch panel are different in shape from those formed inside the touch panel, and the occupying size of the driving electrodes and receiving electrodes formed in the outermost region of the touch panel are smaller than those formed inside the touch panel. For example, in the 'c' region of FIG. 7, the shape of the receiving electrode RX6' and driving electrode TX1' formed in the outermost region of the touch panel may be different from the shape of the receiving electrode RX6" and driving electrode TX1" formed inside the touch panel.

Although the driving electrodes and receiving electrodes formed in the outermost region of the touch panel according to the second embodiment of the present invention are different in shape from those formed inside the touch panel, each of the driving electrodes formed in the outermost region of the touch panel comprises two driving electrode sections connected with each other, and each of the receiving electrodes formed in the outermost region of the touch panel comprises two receiving electrode sections connected with each other. In comparison with the case that the occupying size of each of the driving electrodes and receiving electrodes formed in the outermost region of the touch panel is same as that of the driving electrodes and receiving electrodes formed inside the touch panel as shown in FIG. 3(a), the occupying size of each of the driving electrodes and receiving electrodes formed in the outermost region of the touch panel according to the second embodiment of the present invention is smaller than that of the driving electrodes and receiving electrodes formed inside the touch panel. In comparison with the case that the touch sensitivity in the touch coordinates in the outermost area of the active area A/A is relatively lower than touch sensitivity in the touch coordinates in the other areas of the active area A/A as shown in FIG. 3(b), the touch sensitivity in the touch coordinates in the outermost area of the active area in the second embodiment of the present invention may be highly improved in the outermost region of the active area.

Although the second embodiment illustrated above is accomplished by using a structure in which adjacent sides of facing driving and receiving electrodes are corrugated at intersections including the outermost crossing regions of an active area and another structure in which supplemented electrode section(s) are provided (a driving electrode section or a receiving electrode section or both depending on the location of the intersection including the outermost crossing regions of the active area), alternatively, the second embodiment may be realized by using either one of the above two different structures without compromising the improving effect on the touch sensitivity of the touch panel according to the embodiment of the present invention.

Although not shown, a touch panel according to a third embodiment of the present invention may be formed by combining the above structures of the touch panels according to the first and second embodiments of the present invention.

The touch panel according to the third embodiment of the present invention is provided in such a manner a plurality of driving electrode lines 133 are formed at different layers in a bezel B, as described in the above first embodiment of the present invention, and adjacent sides of facing driving and receiving electrodes are corrugated at intersections 190 including the outermost crossing regions 180 of an active area A, as described in the above second embodiment of the present invention.

According to the first and third embodiments of the present invention, the driving electrode lines are formed at different layers, whereby the width of bezel may be reduced.

Also, according to the second embodiment of the present invention, the touch sensitivity may be highly improved in the outermost region of the active area. Meanwhile, since the an occupying size of the over scan area the driving electrodes and receiving electrodes formed in the outermost region of the touch panel are smaller than those formed inside the touch panel, the width of bezel may be reduced.

Moreover, according to the second embodiment of the present invention, the mutual capacitance of the outermost electrode may be adjusted to be equal to the mutual capacitance of the other electrode in the remaining regions except the outermost region. According as the variation of fringe capacitance becomes larger, the touch sensitivity becomes better.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

What is claimed is:
1. A touch panel, comprising:
a glass substrate;
a plurality of driving electrodes formed in an active area on one surface of the glass substrate, a driving pulse being input to the plurality of driving electrodes, each of the plurality of driving electrodes comprising a plurality of driving sections, each of the plurality of driving sections that is disposed at an outermost region of the active area having at least one corrugated edge; and
a plurality of receiving electrodes formed in the active area on one surface of the glass substrate, the receiving electrode crossing the driving electrode, each of the plurality of receiving electrodes comprising a plurality of receiving sections, each of the plurality of receiving sections that is disposed at an outermost region of the active area having at least one corrugated edge,
wherein adjacent sides of each driving electrode and each receiving electrode for forming an intersection including an outermost crossing region formed in the outermost region of the active area, among crossing regions of the driving electrode and receiving electrode, are corrugated, and
wherein adjacent sides of each driving electrode and each receiving electrode at crossing regions other than in the outermost region of the active area are not corrugated.

2. The touch panel of claim 1, wherein the outermost crossing regions are formed close to inner sides of four outermost lines of the active area.

3. The touch panel of claim 2, wherein, among the outermost crossing regions formed close to the outermost line:
a first driving electrode section is formed in each of the intersections formed along the first outermost line parallel to the receiving electrodes while being in parallel to the first outermost line;
a second driving electrode section is connected with the first driving electrode section through the outermost crossing region;
a first receiving electrode section is formed in a first lateral side between the first driving electrode section and second driving electrode section; and
a second receiving electrode section is connected with the first receiving electrode section through the outermost crossing region.

4. The touch panel of claim 3, wherein:
adjacent sides of the second driving electrode section and first receiving electrode section are corrugated; and
adjacent sides of the second driving electrode section and second receiving electrode section are corrugated.

5. The touch panel of claim 2, wherein, among the outermost crossing regions formed close to the outermost line:
a third receiving electrode section is formed in each of the intersections formed along the second outermost line in parallel to the driving electrodes while being in parallel to the second outermost line;
a fourth receiving electrode section is connected with the third receiving electrode section through the outermost crossing region;
a third driving electrode section is formed in a second lateral side between the third receiving electrode section and the fourth receiving electrode section; and
a fourth driving electrode section is connected with the third driving electrode section through the outermost crossing region.

6. The touch panel of claim 2, wherein, among the outermost crossing regions formed close to the outermost line:
a first driving electrode section is formed in each of the intersections formed at the crossing region of the first outermost line parallel to the receiving electrodes and the second outermost line parallel to the driving electrodes while being parallel to the first outermost line;
a second driving electrode section is connected with the first driving electrode section through the outermost crossing region;
a third receiving electrode section is formed in a first lateral side between the first driving electrode section and the second driving electrode section and is provided in parallel to the second outermost line; and
a fourth receiving electrode section is connected with the third receiving electrode section through the outermost crossing region.

7. The touch panel of claim 1, further comprising:
a bezel corresponding to a circumferential area of the active area on the glass substrate,
wherein driving electrode lines respectively connected with the plurality of driving electrodes and receiving electrode lines respectively connected with the plurality of receiving electrodes are formed in the bezel, and
wherein the driving electrode lines are formed at different layers in the bezel, and
wherein one or more insulating layers are respectively interposed between each layer comprising the driving electrode lines.

8. A display device, comprising:
a panel comprising pixels formed in respective crossing regions of gate and data lines;
the touch panel according to claim 1;
a driver for driving the panel; and
a touch IC for driving the touch panel.

9. A touch panel, comprising:
a glass substrate;
a plurality of driving electrodes formed in an active area on one surface of the glass substrate, a driving pulse being input to the plurality of driving electrodes, each of the plurality of driving electrodes comprising a plurality of driving sections, each of the plurality of driving sections that is disposed at an outermost region of the active area having at least one corrugated edge;
a plurality of receiving electrodes formed in the active area on the one surface of the glass substrate, the receiving electrode crossing the driving electrode, each of the plurality of receiving electrodes comprising a plurality of receiving sections, each of the plurality of receiving sections that is disposed at an outermost region of the active area having at least one corrugated edge;
a plurality of driving electrode lines respectively connected with the plurality of driving electrodes;
a plurality of receiving electrode lines respectively connected with the plurality of receiving electrodes; and
a bezel corresponding to a circumferential area of the active area,
wherein the plurality of driving electrode lines are formed at different layers in the bezel,
wherein one or more insulating layers are respectively interposed between each layer comprising the driving electrode lines, and
wherein adjacent sides of each driving electrode and each receiving electrode at crossing regions other than in the outermost region of the active area are not corrugated.

10. A display device, comprising:
a panel comprising pixels formed in respective crossing regions of gate and data lines;
the touch panel according to claim 9;
a driver for driving the panel; and
a touch IC for driving the touch panel.

11. The touch panel of claim 9, wherein:
adjacent sides of each driving electrode and each receiving electrode for forming an intersection including an outermost crossing region formed in the outermost region of the active area, among crossing regions of the driving electrode and receiving electrode, are corrugated; and
the outermost crossing regions are formed close to inner sides of four outermost lines of the active area.

12. The touch panel of claim 11, wherein, among the outermost crossing regions formed close to the outermost line:
a first driving electrode section is formed in each of the intersections formed along the first outermost line parallel to the receiving electrodes while being in parallel to the first outermost line;
a second driving electrode section is connected with the first driving electrode section through the outermost crossing region;
a first receiving electrode section is formed in a first lateral side between the first driving electrode section and second driving electrode section; and
a second receiving electrode section is connected with the first receiving electrode section through the outermost crossing region.

13. The touch panel of claim 12, wherein:
adjacent sides of the second driving electrode section and first receiving electrode section are corrugated; and
adjacent sides of the second driving electrode section and second receiving electrode section are corrugated.

14. The touch panel of claim 11, wherein, among the outermost crossing regions formed close to the outermost line:
a third receiving electrode section is formed in each of the intersections formed along the second outermost line in parallel to the driving electrodes while being in parallel to the second outermost line;
a fourth receiving electrode section is connected with the third receiving electrode section through the outermost crossing region;
a third driving electrode section is formed in a second lateral side between the third receiving electrode section and the fourth receiving electrode section; and
a fourth driving electrode section is connected with the third driving electrode section through the outermost crossing region.

15. A touch panel, comprising:
a glass substrate;
a plurality of driving electrodes formed in an active area on one surface of the glass substrate, a driving pulse being input to the plurality of driving electrodes, each of the plurality of driving electrodes comprising a plurality of driving sections, each of the plurality of driving sections that is disposed at an outermost region of the active area having at least one corrugated edge; and
a plurality of receiving electrodes formed in the active area on the one surface of the glass substrate, the receiving electrode crossing the driving electrode, each of the plurality of receiving electrodes comprising a plurality of receiving sections, each of the plurality of receiving sections that is disposed at an outermost region of the active area having at least one corrugated edge,
wherein a size of a driving electrode and a receiving electrode that are formed in an outermost region of the glass substrate is different from that of another driving electrode and another receiving electrode formed inside the glass substrate, and
wherein adjacent sides of each driving electrode and each receiving electrode at crossing regions other than in the outermost region of the active area are not corrugated.

16. The touch panel of claim 15, wherein:
adjacent sides of each driving electrode and each receiving electrode for forming an intersection including an outermost crossing region formed in the outermost region of the active area, among crossing regions of the driving electrode and receiving electrode, are corrugated; and
the outermost crossing regions are formed close to inner sides of four outermost lines of the active area.

17. The touch panel of claim 16, wherein, among the outermost crossing regions formed close to the outermost line:
a first driving electrode section is formed in each of the intersections formed along the first outermost line parallel to the receiving electrodes while being in parallel to the first outermost line;
a second driving electrode section is connected with the first driving electrode section through the outermost crossing region;
a first receiving electrode section is formed in a first lateral side between the first driving electrode section and second driving electrode section; and
a second receiving electrode section is connected with the first receiving electrode section through the outermost crossing region.

18. The touch panel of claim 17, wherein:
adjacent sides of the second driving electrode section and first receiving electrode section are corrugated; and
adjacent sides of the second driving electrode section and second receiving electrode section are corrugated.

19. The touch panel of claim 16, wherein, among the outermost crossing regions formed close to the outermost line:
a third receiving electrode section is formed in each of the intersections formed along the second outermost line in parallel to the driving electrodes while being in parallel to the second outermost line;
a fourth receiving electrode section is connected with the third receiving electrode section through the outermost crossing region;
a third driving electrode section is formed in a second lateral side between the third receiving electrode section and the fourth receiving electrode section; and
a fourth driving electrode section is connected with the third driving electrode section through the outermost crossing region.

20. The touch panel of claim 16, wherein, among the outermost crossing regions formed close to the outermost line:
a first driving electrode section is formed in each of the intersections formed at the crossing region of the first outermost line parallel to the receiving electrodes and the second outermost line parallel to the driving electrodes while being parallel to the first outermost line;
a second driving electrode section is connected with the first driving electrode section through the outermost crossing region;
a third receiving electrode section is formed in a first lateral side between the first driving electrode section and the second driving electrode section and is provided in parallel to the second outermost line; and
a fourth receiving electrode section is connected with the third receiving electrode section through the outermost crossing region.

* * * * *